(12) United States Patent
Simard et al.

(10) Patent No.: US 7,392,472 B2
(45) Date of Patent: Jun. 24, 2008

(54) LAYOUT ANALYSIS

(75) Inventors: Patrice Y. Simard, Belleveue, WA (US); James Russell Rinker, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 674 days.

(21) Appl. No.: 10/133,939

(22) Filed: Apr. 25, 2002

(65) Prior Publication Data

US 2003/0204816 A1    Oct. 30, 2003

(51) Int. Cl.
    *G06F 17/00*    (2006.01)
(52) U.S. Cl. .................................. 715/243; 715/255
(58) Field of Classification Search .......... 715/517, 715/530, 243, 255; 345/440, 467
    See application file for complete search history.

(56) References Cited

U.S. PATENT DOCUMENTS

| | | |
|---|---|---|
| 3,606,546 A | 9/1971 | Dudley et al. |
| 3,719,922 A | 3/1973 | Lopes, Jr. et al. |
| 3,882,454 A | 5/1975 | Marie et al. |
| 4,606,069 A | 8/1986 | Johnson et al. |
| 4,747,156 A | 5/1988 | Wahl |
| 4,754,492 A | 6/1988 | Malvar |
| 4,922,545 A | 5/1990 | Endoh et al. |
| 4,924,494 A | 5/1990 | Shung |
| 5,077,807 A | 12/1991 | Bokser |
| 5,129,014 A | 7/1992 | Bloomberg |
| 5,304,991 A | 4/1994 | Motegi |
| 5,402,146 A | 3/1995 | Rodriguez et al. |
| 5,434,953 A | 7/1995 | Bloomberg |
| 5,454,047 A | 9/1995 | Chang et al. |
| 5,572,565 A | 11/1996 | Abdel-Mottaleb |
| 5,572,604 A | 11/1996 | Simard |
| 5,592,568 A * | 1/1997 | Wilcox et al. ............... 382/218 |
| 5,610,996 A | 3/1997 | Eller |
| 5,689,585 A * | 11/1997 | Bloomberg et al. ......... 382/229 |
| 5,737,455 A | 4/1998 | Harrington et al. |

(Continued)

FOREIGN PATENT DOCUMENTS

EP    0 567 344 A2    10/1993

(Continued)

OTHER PUBLICATIONS

Debargha Mukherjee, et al.; "JPEG2000-Matched MRC Compression of Compound Documents"; Jun. 6, 2002.

(Continued)

*Primary Examiner*—Rachna Singh
(74) *Attorney, Agent, or Firm*—Amin, Turocy & Calvin, LLP

(57) ABSTRACT

A system and method facilitating layout analysis is provided. The invention includes a layout analyzer having a connected component organizer, a connected joiner, a word organizer and a word joiner. The invention provides for the connected component organizer to organize connected components based upon color, horizontal position and/or vertical position. The invention provides for the connected component joiner to join connected components based, at least in part, upon color, vertical position, horizontal position, a distance between the connected components, height of the connected components and/or width of the connected components. The word organizer organizes words and the word joiner joins words into lines. The joining of words into lines can cause the connected component joining to attempt to further join connected components into words.

26 Claims, 11 Drawing Sheets

U.S. PATENT DOCUMENTS

| | | | |
|---|---|---|---|
| 5,754,183 A * | 5/1998 | Berend et al. | 345/592 |
| 5,778,092 A | 7/1998 | MacLeod et al. | |
| 5,790,696 A | 8/1998 | Takahashi | |
| 5,805,727 A | 9/1998 | Nakano | |
| 5,805,739 A | 9/1998 | Malvar et al. | |
| 5,828,771 A | 10/1998 | Bloomberg | |
| 5,883,986 A * | 3/1999 | Kopec et al. | 382/310 |
| 5,910,805 A * | 6/1999 | Hickey et al. | 345/467 |
| 5,914,748 A | 6/1999 | Parulski et al. | |
| 5,915,044 A | 6/1999 | Gardos et al. | |
| 5,917,951 A | 6/1999 | Thompson et al. | |
| 5,917,964 A | 6/1999 | Normile | |
| 5,923,380 A | 7/1999 | Yang et al. | |
| 5,930,377 A | 7/1999 | Powell et al. | |
| 5,960,111 A | 9/1999 | Chen et al. | |
| 5,960,119 A | 9/1999 | Echigo et al. | |
| 5,991,515 A | 11/1999 | Fall et al. | |
| 6,000,124 A | 12/1999 | Saito et al. | |
| 6,020,972 A | 2/2000 | Mahoney et al. | |
| 6,029,126 A | 2/2000 | Malvar | |
| 6,058,362 A | 5/2000 | Malvar | |
| 6,064,762 A | 5/2000 | Haenel | |
| 6,069,636 A * | 5/2000 | Sayuda et al. | 345/619 |
| 6,072,496 A | 6/2000 | Guenter et al. | |
| 6,073,153 A | 6/2000 | Malvar | |
| 6,094,506 A | 7/2000 | Hullender | |
| 6,100,825 A | 8/2000 | Sedluk et al. | |
| 6,108,444 A * | 8/2000 | Syeda-Mahmood | 382/186 |
| 6,108,446 A | 8/2000 | Hoshen | |
| 6,115,689 A | 9/2000 | Malvar | |
| 6,118,890 A | 9/2000 | Senior | |
| 6,137,908 A | 10/2000 | Rhee | |
| 6,144,767 A | 11/2000 | Bottou et al. | |
| 6,151,424 A | 11/2000 | Hsu | |
| 6,154,762 A | 11/2000 | Malvar | |
| 6,182,034 B1 | 1/2001 | Malvar | |
| 6,192,360 B1 | 2/2001 | Dumais | |
| 6,233,364 B1 | 5/2001 | Krainiouk et al. | |
| 6,240,380 B1 | 5/2001 | Malvar | |
| 6,253,165 B1 | 6/2001 | Malvar | |
| 6,256,608 B1 | 7/2001 | Malvar | |
| 6,272,253 B1 | 8/2001 | Bannon et al. | |
| 6,285,801 B1 | 9/2001 | Mancuso et al. | |
| 6,295,371 B1 * | 9/2001 | Rucklidge et al. | 382/176 |
| 6,309,424 B1 | 10/2001 | Fallon | |
| 6,310,972 B1 | 10/2001 | Li et al. | |
| 6,321,243 B1 | 11/2001 | Ballard | |
| 6,324,560 B1 | 11/2001 | Malvar | |
| 6,326,977 B1 | 12/2001 | Westerman | |
| 6,334,001 B2 | 12/2001 | de Queiroz et al. | |
| 6,345,119 B1 | 2/2002 | Hotta et al. | |
| 6,411,733 B1 * | 6/2002 | Saund | 382/190 |
| 6,564,263 B1 * | 5/2003 | Bergman et al. | 709/231 |
| 6,633,670 B1 | 10/2003 | Matthews | |
| 6,658,151 B2 * | 12/2003 | Lee et al. | 382/229 |
| 6,731,800 B1 | 5/2004 | Barthel et al. | |
| 6,735,335 B1 * | 5/2004 | Liu et al. | 382/218 |
| 6,738,079 B1 * | 5/2004 | Kellerman et al. | 715/763 |
| 6,819,796 B2 | 11/2004 | Hong et al. | |
| 6,826,727 B1 * | 11/2004 | Mohr et al. | 715/517 |
| 6,901,153 B1 | 5/2005 | Leone | |
| 6,907,141 B1 | 6/2005 | Okamoto | |
| 6,941,014 B2 * | 9/2005 | Lin et al. | 382/176 |
| 6,977,664 B1 | 12/2005 | Jinzenji et al. | |
| 7,039,232 B2 * | 5/2006 | Nagarajan et al. | 382/173 |
| 2001/0004618 A1 * | 6/2001 | Hur | 477/107 |
| 2002/0064313 A1 | 5/2002 | Cheng | |
| 2003/0123729 A1 | 7/2003 | Mukherjee et al. | |
| 2003/0133615 A1 * | 7/2003 | Bern et al. | 382/225 |
| 2003/0198386 A1 * | 10/2003 | Luo | 382/199 |
| 2003/0229856 A1 * | 12/2003 | Lynn et al. | 715/517 |

FOREIGN PATENT DOCUMENTS

| | | |
|---|---|---|
| EP | 0 621 554 A2 | 10/1994 |
| EP | 0802680 | 10/1997 |
| EP | 0853421 | 7/1998 |
| EP | 1006714 A2 | 6/2000 |
| EP | 1104916 | 6/2001 |
| EP | 1006714 A3 | 9/2001 |
| EP | 1146478 A2 | 10/2001 |
| GB | 2181875 | 4/1987 |
| GB | 2 230 633 A | 10/1990 |

OTHER PUBLICATIONS

Rangachar Kasturi, et al.; "Document Image Analysis: A Primer"; Sadhana vol. 27, Part 1, Feb. 2002, pp. 3-22.

Qian Huang el al.; "Foreground/Background Segmentation of Color Images by Integration of Multiple Cues"; Proceedings of '95 Int'l. Conf. on Image Processing (ICIP.

Guotong Feng, et al.; "High Quality MRC Document Coding"; School of Electrical and Computer Engineering; Purdue University; Sarnoff Corporation.

Ping Wah Wong; Halftoning by Multiscale Dot Distribution; Proceedings of the '95 Int' l. Conf. on Image Processing (ICIP '95); pp. 117-120.

Yann LeCun, et al.; "Learning Algorithms for Classification: A Comparison on Handwritten Digit Recongition"; AT&T Bell Laboratories.

Patrice Y. Simard, et al.; "Boxlets: A Fast Convolution Algorithm for Signal Processing and Neural Networks"; AT&T Labs-Research.

Trevor Hastie, et al.; "Metrics and Models for Handwritten Character Recognition"; Dec. 8, 1997; pp. 1-18.

Leon Bottou, et al.; "High Quality Document Image Compression with DjVu"; Jul. 13, 1998; AT&T Labs.

Patrick Haffner, et al.; "Color Documents on the Web with DjVu"; AT&T Labs—Research.

Yiu-fai Wong, et al.; Preprocessing of Video Signals for MPEG Coding by Clustering Filter; Proceedings of the '95 Int'l. Conf. on Image Processing (ICIP '95); pp. 129-132.

Patrick Haffner, et al.; "DjVu: Analyzing and Compressing Scanned Documents for Internet Distribution"; AT&T Labs-Research; pp. 1-4.

Felix Balado Pumarino, et al.; "A Two-Stage Codebook Building Method Using Fast WAN"; University of Vigo, Communications Technology Department.

Henrique S. Malvar; "Fast Progressive Wavelet Coding"; Microsoft Research.

Patrice Y. Simard, et al.; "A Wavelet Coder for Masked Images"; Proceedings of the Data Compression Conference (DCC'01); Microsoft Research.

Queiroz, et al. "Optimizing Block-Thresholding Segmentation for Multilayer Compression of Compound Images" (Sep. 9, 2000) IEEE Transactions on Image Processing, IEEE Inc. New York, pp. 1461-1471.

Salembier, et al. "Region-Based Representations of Image and Video: Segmentation Tools for Multimedia Services" (Dec. 8, 1999) IEEE Transactions on Circuits and Systems for Video Technology, IEEE Inc. New York, pp. 1147-1169.

Haffner, et al. "Browsing through high quality documents images with DjVu" Research and Technology Advances in Digital Libraries. ADL 1998 Proceedings (Apr. 22, 1998) IEEE International Forum in Santa Barabra, California, pp. 309-318.

Simard, et al. "A Wavelet Coder for Masked Images" Proceedings IEE Data Compression Conference (Mar. 27, 2001) Snowbird, Utah, pp. 93-102.

Simard, et al. " A Forefround/Background Separation Algorith for Image Compression" (Mar. 23, 2004) Data Compression Conference, Snowbird, Utah, pp. 498-507.

European Search Report dated Oct. 4, 2005 mailed Oct. 13, 2005 for PCT U.S. Appl. No. 10/180,169, 5 pages.

Mukherjee, et al. "LPEG-Matched MRC Compression of Compound Documents" Proceedings 2001 International Conference of Image Processing (Oct. 7-10, 2001) Thessalonki, Greece, pp. 434-437.

Cosman, et al. "Memory Efficient Quadtree Wavelet Coding for Compound Images" Conference Record of the Thirty-Third Asilomar Conference (Oct. 24-27, 1999) Piscataway, New Jersey, pp. 1173-1177.

European Search Report dated Oct. 4, 2005 mailed Oct. 13, 2005 for PCT U.S. Appl. No. 03/005,431, 5 pages.

U.S. Appl. No. 10/133,842, filed Apr. 25, 2002, Simard et al.

U.S. Appl. No. 11/198,562, filed Aug. 5, 2005, Simard et al.

U.S. Appl. No. 11/286,622, filed Nov. 23, 2005, Malvar et al.

European Search Report dated Sep. 15, 2005, mailed Sep. 30, 2005, for European Patent Application Serial No. EP 03 00 5429, 4 Pages.

Witten, Ian H., et al; "Textual Image Compression", Data Compression Conference, IEEE, 10 pages, Mar. 24, 1992.

European Search Report dated Nov. 21, 2005, mailed Nov. 30, 2005, for European Patent Application Serial No. EP 03 00 6769, 3 Pages.

* cited by examiner

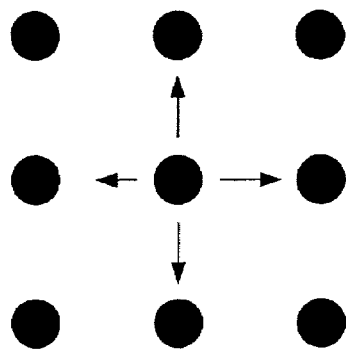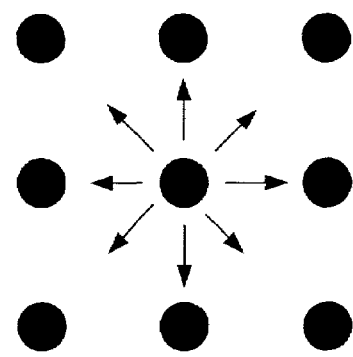
200
300
FIG. 2  FIG. 3

| X SIZE | Y SIZE | COLOR | HORIZONTAL POSITION | VERTICAL POSITION |
|--------|--------|-------|---------------------|-------------------|
| 10 | 20 | BLACK | 5 | 12 |
| 12 | 15 | BLACK | 25 | 12 |
| 8 | 15 | WHITE | 5 | 102 |
| 11 | 20 | WHITE | 25 | 102 |
| 4 | 11 | WHITE | 50 | 102 |

FIG. 4

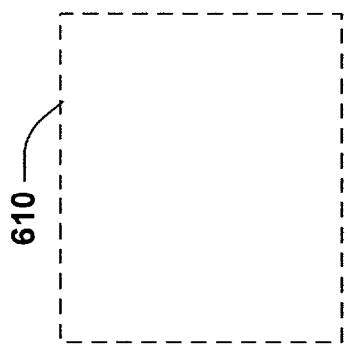
FIG. 6

LAYOUT ANALYSIS

TECHNICAL FIELD

The present invention relates generally to document image processing, and more particularly to a system and method facilitating layout analysis.

BACKGROUND OF THE INVENTION

The amount of information available via computers has dramatically increased with the wide spread proliferation of computer networks, the Internet and digital storage means. With such increased amount of information has come the need to transmit information quickly and to store the information efficiently.

Textual documents are often kept or transmitted in bitmap form (e.g., fax, paper, or bitmaps). In such form, the text cannot be easily extracted, searched, re-flowed, cut and pasted, re-purposed, or compressed, because it is not known a priori which pixels should be interpreted as text, background, image, or just noise.

There is, therefore, a need to recover structure, such as words, lines, and paragraphs and blocks from the pixel representation of a document. The indiscriminate pixels can be referred as "dead bits", and the task is to recover the "live" structure of the document. The recovered structure can be used to locate the good candidate for textual characters and, thus, can facilitate optical character recognition (OCR). The textual structure can also help text selection for features such as "cut & paste". Similarly, the textual structure can give hint(s) about how to insert and reflow text (e.g., reflow only the current paragraph while moving the next paragraphs as whole). Finally, the structure can help compression greatly by predicting the position of characters with respect to their current line, or block.

Additionally, data compression of digital documents should make use of an intended purpose or ultimate use of a document. Some digital documents are employed for filing or providing hard copies. Other documents may be revised and/ or edited. Many conventional data compression methodologies fail to handle re-flowing of text and/or images when viewed, and fail to provide efficient and effective means to enable compression technology to recognized characters and re-flow them to word processors, personal digital assistants (PDAs), cellular phones, and the like. Therefore, if hard copy office documents are scanned into digital form, current compression technology can make it difficult, if not impossible, to update, amend, or in general change the digitized document.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a layout analyzer that receives connected component information. The connected component information can include color, vertical position, horizontal position, height (e.g., y size) and/or width (e.g., x size) of connected component(s). The connected component information can be related to an image input (e.g., based on a document to be archived and/or transmitted). The image input can be a document image (e.g., a binary, RGB and/or YUV representation of document(s)). The connected component information can be based, at least in part, upon a binary representation associated with the image input. Such binary representation can be obtained via thresholding, or via more complex binarization method. For instance, some technologies separate a color image into a foreground and a background, with a binary image which indicate for each pixel whether the pixel belongs to the foreground or the background. The binary image, sometimes referred as a mask, is generally intended to capture text, lines, graphic art and/or many other sharp contrast component.

The layout analyzer can output layout information to be used, for example, by an encoder to enable OCR, cut & paste, data compression, etc. The layout information can further enable reflow of connected component(s) on an output device, such as, a computer display, PDA, text-enabled mobile telephone and/or text-enabled pager.

The invention can be explained in terms of operations on connected components; however, it should be understood that in some case, some connected components can be can be separated, while yet other connected components can be joined, and the result is still identified as connected components. For instance, the letter "p" from a line, may touch a "t" from the line below, because of pixel noise, smirring, or as a result of a particularly artistic font. The combined letter would then be an unusually large connected component. It is possible that during the layout analysis performed on connected component (CC), that particular connected component can be identified as an outlier (using OCR for instance) and consequently broken into two or more pieces. Even though the two pieces would still be touching, they can be identified as two connected components. Similarly, the letter "i" is composed of two distinct connected components, but as the layout analysis progresses, it is fairly easy to detect that they form a single letter and can advantageously be considered as one unique entity, which can be identified as a connected component.

In what follows, we will use the term joining of connected components not in the sense of creating another "connected component", but rather, connected component will be grouped (or joined) into "words". Similarly, words will be joined into lines, and lines will be joined to form blocks (e.g., paragraphs).

The layout analyzer includes a CCs to word component and a words to line component. The CCs to word component includes a CC organizer that is adapted to organize connected component(s) by color, vertical position and/or horizontal position. The CCs to word component further includes a CC joiner adapted to join connected components based, at least in part, upon color, vertical position, horizontal position, join distance (e.g., distance between the connected components), height of the connected components and/or width of the connected components. Joined connected components can include two or more connected components and form a word.

The words to line component includes a word organizer adapted to organize words by at least one of color, vertical position, horizontal position, and length and a word joiner, adapted to join words into line, based at least in part on vertical position, horizontal position, join distance, and statistics collected over the words to be joined, such as word angle, median height, median width of connected components composing the words.

Therefore, layout analysis of the layout analyzer can be decomposed in at least two processes: The process of joining connected components into words by the CC joiner, and the process of joining words into lines by the word joiner of the words to line component.

Another aspect of the present invention provides for a layout analyzer to optionally further include a third process—joining lines into blocks by a lines to block component. The lines to block component includes a line organizer and a line joiner.

The line organizer is adapted to organize lines by color, vertical position, horizontal position, and/or length. The line joiner merges lines (comprising previously merged words) into a block. Merging of the line joiner can be similar to the CC joiner and/or the word joiner. The line joiner can proceed by taking a pair of lines and subjecting them to a series of test(s). For example, the test(s) can compare the median widths, the median heights, the angles of each line and/or their respective positions. In one example, the line joiner utilizes a vertical overlap test. For vertical joining, two lines have a vertical overlap (e.g., one is partially above the other). For example, the vertical overlap can be controlled by a threshold, multiplied by the median width of the longest line. The threshold can be a function of the length of the line, meaning that the test might fail at first, but succeed later, when more statistics have been gathered.

When words are joined into lines by the word joiner, line statistics are recomputed. When lines are joined into blocks by a line joiner, block statistics are recomputed. Since connected component(s) have access to word(s) it/they belong to, and the word(s) have access to the line(s) it/they belong to, and the line(s) have access o the block(s) it/they belong too, in one example, substantially each entity (e.g., CC, word, line) to have access to the statistics of the largest enclosing entity, all the way to the blocks if blocks have been made. Because the statistics can change for each joining entity operation (e.g., CC joiner, word joiner and/or line joiner), other joining attempts over children of these entities (which have previously failed) can be revisited and might succeed.

Yet another aspect of the present invention provides for a layout analysis system having a layout analyzer and a connected component store. The connected component store stores information associated with a plurality of connected components, such as, width (e.g., x size), height (e.g., y size), color, horizontal position (e.g., absolute and/or relative) and/or vertical position (e.g., absolute and/or relative) of the plurality of connected components.

Another aspect of the present invention provides for the layout analyzer to be employed in a vast array of document image applications, including, but not limited to, segmented layered image systems, photocopiers, document scanners, optical character recognition systems, personal digital assistants, fax machines, digital cameras, tablet personal computers and/or digital video cameras.

Other aspects of the present invention provide methods for layout analysis, a computer readable medium having computer usable instructions for a system for layout analysis, a computer readable medium storing computer executable instructions operable to perform a method for layout analysis and a data packet adapted to be transmitted between two or more computer processes comprising information associated with layout information, the layout information comprising at least two joined connected components, joining being based, at least in part, upon at least one of color, vertical position, horizontal position, a distance between the connected components, height of the connected components and width of the connected components.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 2 is a diagram illustrating 4-connectivity property.

FIG. 3 is a diagram illustrating 8-connectivity property.

FIG. 4 is an exemplary connected component information data structure in accordance with an aspect of the present invention.

FIG. 6 is a block diagram illustrating a focus connected component and a connected component in close horizontal proximity.

DETAILED DESCRIPTION OF THE INVENTION

Figure 1:
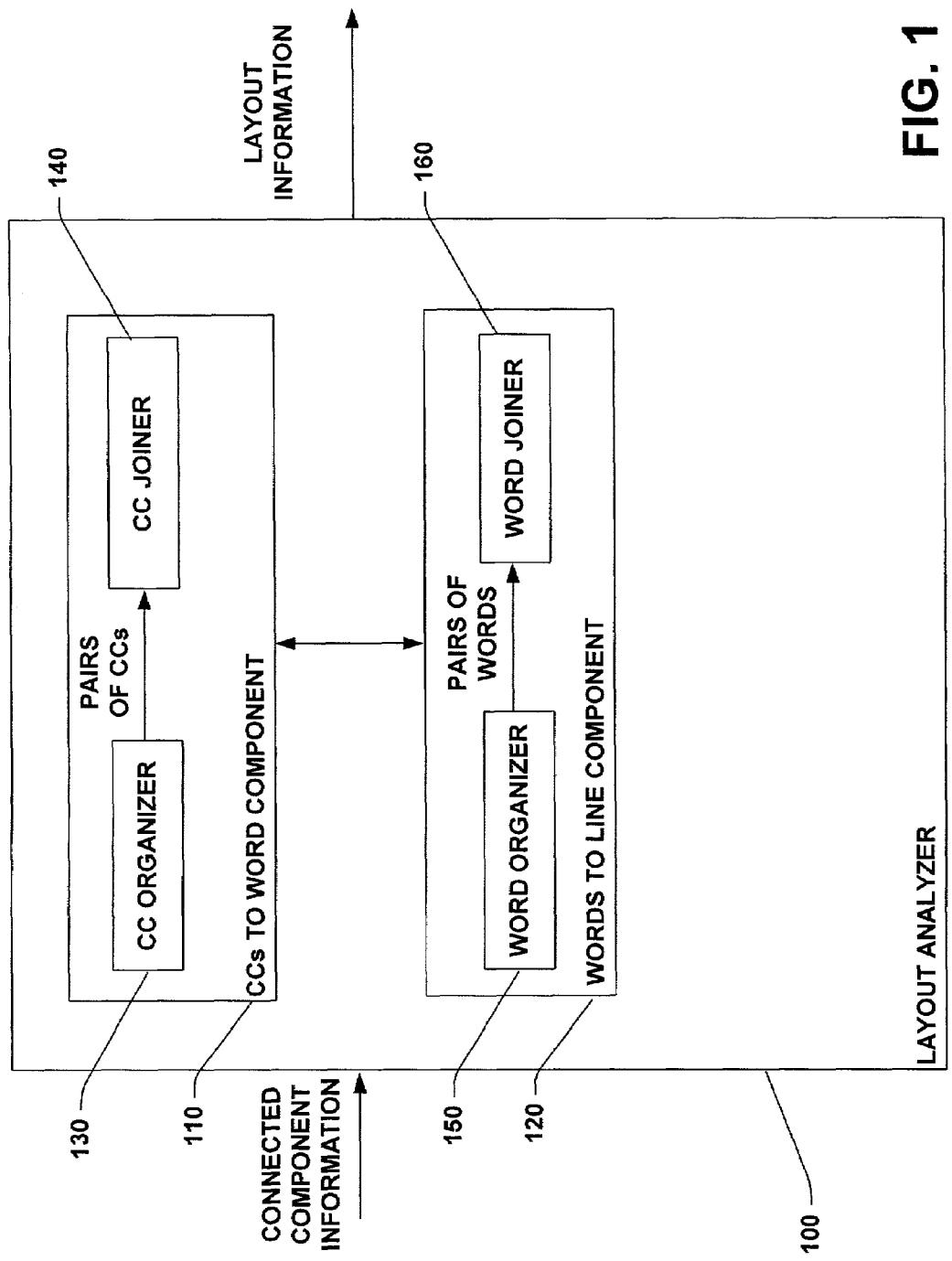
FIG. 1 is a block diagram of a layout analyzer in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Further, "document image" is intended to refer to a digital representation of document(s) comprising one or more color(s) (e.g., binary (e.g., black/white), gray-scale and/or color document(s)). Additionally, a document image can have image(s), text and/or text with images. A document image can be binary, RGB and/or YUV representations of document(s). An RGB document image is represented by red, green and blue components. A YUV document image is represented using a luminescence component denoted by Y and chrominance components denoted by U and V. Less bits can be used to represent the chrominance components U and V without significantly sacrificing visual quality of the YUV image. The YUV representation is, generally, a more compact and easy to use representation than an RGB representation. A document image comprises picture elements commonly referred to as "pixels". A document image can be based on single or multi-page document(s) of any shape or size.

Referring to FIG. 1, a layout analyzer 100 in accordance with an aspect of the present invention is illustrated. The layout analyzer 100 includes a CCs to word component 110 and a words to line component 120. The CCs to word component 110 includes a CC organizer 130 and a CC joiner 140. The words to line component 120 includes a word organizer 150 and a word joiner 160.

The layout analyzer 100 receives connected component information. A "connected component" refers to a set of pixels of a given color that are connected (e.g., having 4-connectivity and/or 8-connectivity). Referring briefly to FIG. 2, a diagram 200 depicting the 4-connectivity property is illustrated. The 4-connectivity property only identifies connected pixels in four primary compass directions. FIG. 2 illustrates the 4-connectivity property by showing a pixel surrounded by 4 pixels in the four primary compass directions. Turning next to FIG. 3, a diagram 300 depicting the 8-connectivity property is illustrated. FIG. 3 illustrates the 8-connectivity property by showing a pixel surrounded by 8 pixels in the eight principal directions. Connected components can include text as well as non-textual marks. It is to be appreciated that the systems and methods of the present invention can employ connected components having any suitable degree of connectivity and is not limited to connected components of 4-connectivity or 8-connectivity.

Each connected component has associated information which can include color, vertical position, horizontal position, height (e.g., y size) and/or width (e.g., x size) of connected component(s). The connected component information can be computed effectively from an image using a connected component extractor (not shown) and can be related to an image input (e.g., based on a document to be archived and/or transmitted). For example, the image input can be a document image (e.g. a binary, RGB and/or YUV representation of document(s)). The connected component information can be based, at least in part, upon a binary representation associated with the image input. Such binary representation can be obtained via thresholding, or via more complex binarization method. For instance, some technologies separate a color image into a foreground and a background, with a binary image which indicate for each pixel whether the pixel belongs to the foreground or the background. The binary image, sometimes referred as mask, is generally intended to capture text, lines, graphic art and/or many other sharp contrast component(s).

Turning back to FIG. 1, the layout analyzer 100 is adapted to organize connected component(s) by color, vertical position and/or horizontal position. Thereafter, the layout analyzer 100 joins connected components based, at least in part, upon color, vertical position, horizontal position, join distance (e.g., distance between the connected components), height of the connected components and/or width of the connected components. The layout analyzer 100 can output layout information to be used, for example, by an encoder to enable data compression. The layout information can further enable reflow of connected component(s) on an output device (not shown) (e.g., computer display, PDA, text-enabled mobile telephone and/or text-enabled pager).

The CCs to word component 110 facilitates organization and joining of connected components into a word. As used in this application, a "word" refers to a group of connected components which are within physical proximity to each other and can include letter(s), number(s) and/or punctuation mark(s); and, as such, as used in this application "word" is not limited to grammatical words.

The CC organizer 130 receives connected component information and organizes (e.g., sorts) connected component(s) by color, vertical position and/or horizontal position. The CC organizer 130 can effectively limit the number of pair of connected component which are compared in order to join them into word. In one example, the CC organizer 130 can sort the connected components according to vertical positions, and only consider the pairs of connected components that are sufficiently close—with some vertical overlap, as candidate for being adjacent in a word. In another example, the CC organizer 130 can limit the number of comparison even more by taking into account the two dimensional layout of the connected component and only compare those that are within a short distance. In yet another example, the CC organizer 130 sorts the connected components based on color, vertical position and then horizontal position. Each connected component is then considered for joining in order. A join distance can be calculated for the connected component of focus. For example, the join distance can initially be calculated as a percentage (e.g., 50 percent) of the focus connected component width; however, in the instance where the join distance is less than a percentage (e.g., 33 percent) of the focus connected component height, the join distance can be calculated as a percentage (e.g., 50 percent) of the focus connected component height.

Referring briefly to FIG. 4, an exemplary data structure 400 of connected component information in accordance with an aspect of the present invention is illustrated. The data structure 400 has a first field 410 storing a width (e.g., x size), a second field 420 storing a height (e.g., y size), a third field 430 storing a color, a fourth field 440 storing a horizontal position (e.g., absolute and/or relative) and/or a fifth field 450 storing a vertical position (e.g., absolute and/or relative) of connected component(s). For example, the x size can be the maximum width of the connected component and the y size can be the maximum height of the connected component.

The data structure 400 is merely exemplary and it is to be appreciated that numerous other structures are contemplated that provide for organizing and/or storing a plurality of data types conducive to facilitating layout analysis in connection with the subject invention. Any such data structure suitable for employment in connection with the present invention is intended to fall within the scope of the appended claims. Such data structures can be stored in computer readable media including, but not limited to, memories and, disks.

Referring back to FIG. 1, in one example, connected component information is sorted by the CC organizer 130 first by color. Thereafter, within each color, the connected component information can be further sorted by vertical position. Finally, within each color and vertical position, the connected component (CC) information can be sorted by horizontal position. Because the CC joiner 140 can attempt several times to join pairs of CCs, the CC organizer 130 may keep, for each CC, a list of k other CCs that are candidate for being a neighboring letter inside a word. Accordingly, connected components of similar color, having about the same vertical position and within horizontal proximity to each other can be attempted to be joined by the CC joiner 140.

Figure 5:
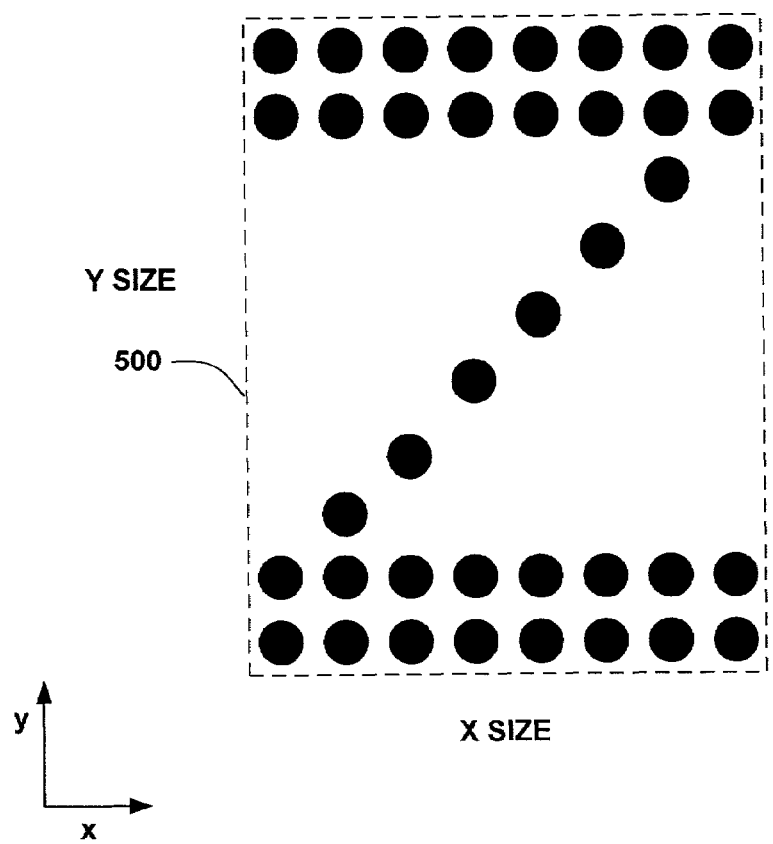
FIG. 5 is an exemplary connected component bounding box in accordance with an aspect of the present invention.

Turning briefly to FIG. 5, an exemplary connected component bounding box 500 in accordance with an aspect of the present invention is illustrated. The bounding box 500 generally comprises a rectangle encompassing a connected component having an x size (width) and a y size (height).

Referring back to FIG. 1, the CC joiner 140 attempts to join connected components based, at least in part, upon, vertical position, horizontal position, join distance (e.g., distance between the connected components), height of the connected components and/or width of the connected components.

In one example, the CC joiner 140 performs a series of tests which must all succeed for two connected components to be considered as adjacent CCs of the same word. The tests are based on the sizes and positions of the bounding boxes, and can also use statistics gathered over previously joined connected component. For instance a first test is based on the bottom right of the bounding box of a first connected component is to the left and a threshold (e.g., 0.5) times the width of the second connected component. A second test is based on the vertical position of the same bottom right of first bounding box is comprised between the top and bottom position of bounding box of second component. Note that the second test is scale invariant, in the sense that if the image is scaled up or down, the result of the test is unchanged. A third test is based on the width ratio between first and second connected component be comprise between a second and third threshold. To prevent oddities due to very skinny letters such as "1" or "l", it can be advantageous to replace the true width by a minimum width, which can be set, for instance, as the largest value of the true width, and half the height. A similar test can be constructed for the ratio of heights between connected components. More robust tests can be made by comparing the width of a connected component with the median width of the word assembled so far for the second connected component. The median is considered more robust than the average because the median is much less sensitive to outliers in the data. As the word is assembled, the median is computed over a larger sample, and becomes a more reliable estimate of the width. A similar and symmetric test can be done by comparing the width of the second connected component with the median width of the word containing the first connected component. If words have been assembled into lines, or into blocks, the median width of the line or of the block can be used for an even better estimate of the font's width. As these estimate become more and more accurate, the tests used by the joiner can be more aggressive. This means that the tests are a function of the number of components that have been previously joined. At the beginning, the tests are very conservative, but as few connected components are joined, it enables other connected component to be joined as well. In effect, connected components "condense" around the places where the joining is easiest and less ambiguous. The above description was made for widths, but clearly, similar tests can be used to compare heights, and median heights. Other tests can involve more than a pair of CC, because when a pair is considered, the CCs belonging to word (parents) of each CC can also be examined.

Referring briefly to FIG. 6, a group 600 of connected components is illustrated. The group 600 includes a focus connected component 610 and a first connected component $620_1$ through an Nth connected component $620_N$, N being an integer greater to or equal to one. The first connected component $620_1$ through the Nth connected component $620_N$ can be referred to collectively as the connected component(s) 620.

For example, the CC joiner 140 can attempt to join the focus connected component 610 to one or more of the connected component(s) 620.

Turning back to FIG. 1, once a join distance has been calculated, connected component(s) of similar color and having about the same vertical position as the focus connected component can be examined for joining. If any of the connected component(s) are within the join distance (e.g., within horizontal proximity to each other), relative size(s) of the connected component(s) are compared with the focus connected component. Connected component(s) within the join distance and of suitable relative size are then joined with the focus connected component.

In comparing relative size(s) of the connected component(s) with the focus-connected component, bounding boxes (width and height) of the connected component(s) and the focus-connected component can be utilized. For example, if (1) the height of a connected component is within a first height range (e.g., about 50 percent to 200 percent) of the height of the focus connected component; and, (2) the width of the connected component is within a width range (e.g., about 12 percent to about 800 percent) of the width of the focus connected component, the connected component can be further considered for joining with the focus connected component; otherwise, the connected component is not joined with the focus connected component.

One such further consideration can be a second height comparison of the connected component with the focus connected component. The second and later comparison may be prompted by the gathering of further information resulting from either additional merges of CCs into a word, additional merges of words into a line, or additional merges of lines into a block. For example, if the height of the connected component is within a second height range (e.g., about 90 percent to 110 percent) of the median height of all the CCs of the group containing the focus CC, the connected component can be joined with the focus connected component (e.g., into a "word"). Alternatively, the median height of the connected components of the group containing the connected component can be compared with either the height of the focus connected component, or with the median height of the CCs of the group containing the focus connected component. If the second height comparison is unsuccessful, a second further consideration can be based on a calculated join distance for the connected component. The join distance can be calculated as described previously with respect to join distance of the focus connected component. If the focus connected component falls within the join distance of the connected component, the connected component can be joined with the focus connected component.

Typically, the further comparisons can be more "relaxed" because they involve statistics that are more reliable, since they have been collected over a larger sample of data. For instance, it is possible that the initial threshold may prevent the joining of CCs into a long word because of a badly distorted letter, e.g., CC, in the middle. But after the two half of the word have been assembled, the median heights and median width of the two half of the word may match very well, and consequently, the threshold of the merge between the two CCs that would not initially join can be relaxed to allow the merge on one of the subsequent tries.

Joined connected components can include two or more connected components. Once substantially all of the connected component have been attempted to be joined, the CC joiner 140 can successively attempt to further join the joined connected components. Statistics for use by the CC joiner 140 (e.g., width and/or height) can be based on the joined connected components. When a pair of CCs passes substantially all the tests, the connected components are joined by the CC joiner 140 and made element of the same word. When this happens, the statistics of the word (for instance, the median width or height) can be recomputed.

As described earlier, the process of joining CCs by the CC joiner 140 enables CCs to have access to more robust statistics by looking for quantities collected over the set (e.g., word, line, block) to which they belong. The new statistics, enables more aggressive tests to be performed.

The word organizer 150 is adapted to organize words by color, vertical position, horizontal position, and/or length. The word joiner 160 of the words to line component 120 similarly attempts to merge words (previously merged by the CC joiner 140) into a line. The word joiner 160 can employ tests similar to those explained previously with regard to the CC joiner 140. However, optionally, the word joiner 160 can employ additional test(s). For example, the word joiner 160 can include a line regression for each word and/or a test for word alignment.

Figure 7:
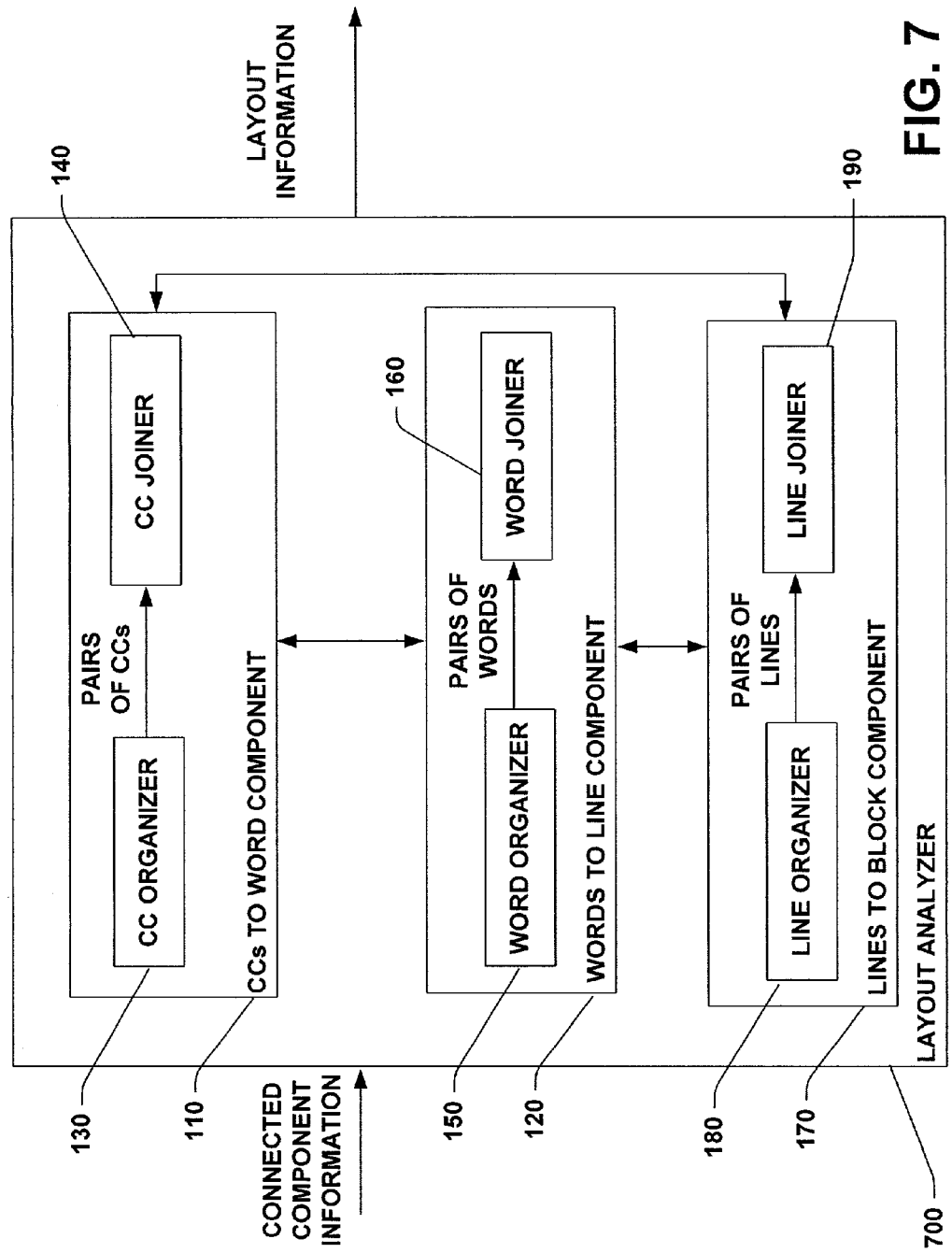
FIG. 7 is a block diagram of a layout analyzer in accordance with an aspect of the present invention.

Therefore, layout analysis of the layout analyzer 100 can be decomposed in at least two processes: The process of joining connected components into words by the CC joiner 140, and the process of joining words into lines by the word joiner 160 of the words to line component 120. Referring briefly to FIG. 7, a layout analyzer 700 can, optionally, include a third process—joining lines into blocks by a lines to block component 170 having a line organizer 180 and a line joiner 190.

The line organizer 180 is adapted to organize lines by color, vertical position, horizontal position, and/or length. The line joiner 190 merges lines (comprising previously merged words) into a block. Merging of the line joiner 190 can be similar to the CC joiner 140 and/or the word joiner 160. The line joiner 190 can proceed by taking a pair of lines and subjecting them to a series of test(s). For example, the test(s) can compare the median widths, the median heights, the angles of each line and/or their respective positions. In one example, the line joiner 190 utilizes a vertical overlap test. For vertical joining, two lines must have a vertical overlap (e.g., one is partially above the other). For example, the vertical overlap can be controlled by a threshold, multiplied by the median width of the longest line. The threshold can be a function of the length of the line, meaning that the test might fail at first, but succeed later, when more statistics have been gathered.

When words are joined into lines by the word joiner 160, line statistics are recomputed. When lines are joined into blocks by a line joiner 190, block statistics are recomputed. Since each connected component has access to the word it belong to, and each word has access to the line it belong to, and each line has access to the block it belong too, in one example, substantially each entity (e.g., CC, word, line) to have access to the statistics of the largest enclosing entity, all the way to the blocks if blocks have been made. Because the statistics can change for each joining entity operation (e.g., CC joiner 140, word joiner 160 and/or line joiner 190), other joining attempts over children of these entities (which have previously failed) can be revisited and might succeed.

Accordingly, the organizers (CC organizer 130, word organizer 150 and/or line organizer 180) can keep ordered lists of most likely candidate for merges, to effectively attempt the most likely merge first.

When words are merged by the word joiner 160, this can be a signal that new CC merges should be attempted by the CCs to word component 110. Similarly, when lines are merged by the line joiner 190, this can be a signal that new words may be merged by the word joiner 160. The process completes since merges are typically not undone since the initial assumption is that merge(s) are not performed erroneously. For this assumption to be true, merge operation(s) are performed conservatively (e.g., to minimize merging error(s)). The cost of under-merging is just that we end up with more entities in the end. The cost of over-merging is that statistics are corrupted, with potentially disastrous effects.

In one example, in order to keep computations reasonable, several optimizations can be done. For instance, it is possible to first attempt substantially all the CC merges by the CCs to word component 110, then substantially all the word merges by the words to line component 120, followed by the line merges by the lines to block component 170. Thereafter, the process is cycled again (e.g., starting with CC merges by the CCs to word component 110, followed by word merges by the words to line component 120 and followed by the line merges by the lines to block 170, etc.).

In one example, at least one of the organizers, for example, the CC organizer 130, the word organizer 150 and/or the line organizer 180, can also keep a list of substantially all the pairs that are potential merges. For instance each entity can have a list of K (e.g. K=4) entities that are good prospects for merging. Every time a merge occurs, substantially all the entity that are children to this entity can be invalidated, so that these prospect merges are re-tested.

While FIG. 1 is a block diagram illustrating components for the layout analyzer 100, it is to be appreciated that the layout analyzer 100, the CCs to word component 110, the words to line component 120, the CC organizer 130, the CC joiner 140, the word organizer 150, the word joiner 160, the lines to block component 170, the line organizer 180 and/or the line joiner 190 can be implemented as one or more computer components, as that term is defined herein. Thus, it is to be appreciated that computer executable components operable to implement the layout analyzer 100, the CCs to word component 110, the words to line component 120, the CC organizer 130, the CC joiner 140, the word organizer 150, the word joiner 160, the lines to block component 170, the line organizer 180 and/or the line joiner 190 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 8:
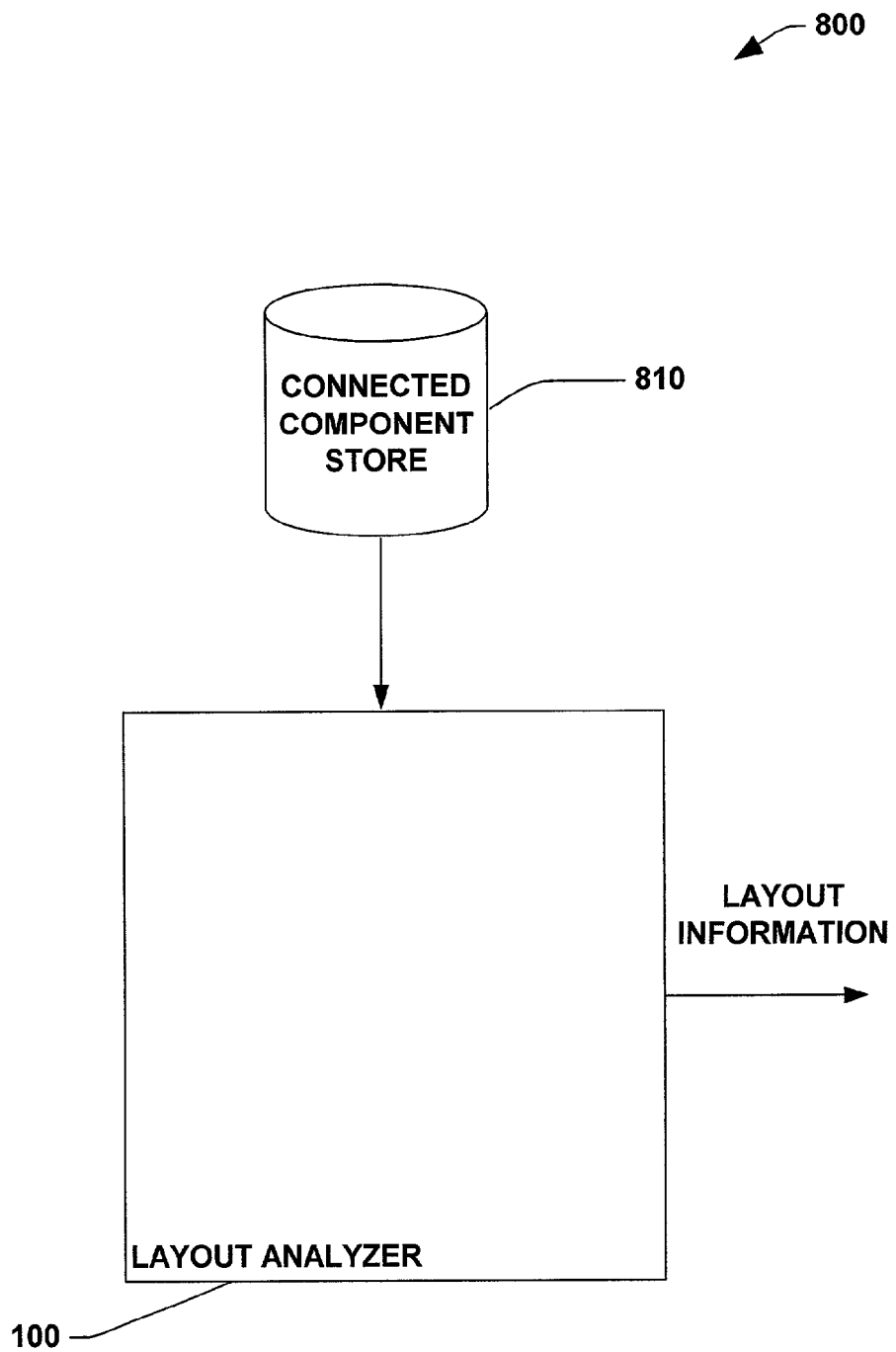
FIG. 8 is a block diagram of a layout analysis system in accordance with an aspect of the present invention.

Turning next to FIG. 8, a layout analysis system 800 in accordance with an aspect of the present invention is illustrated. The system 800 includes a layout analyzer 100 and a connected component store 810.

The connected component store 810 stores information associated with a plurality of connected components. For example, the connected component store 810 can store width (e.g., x size), height (e.g., y size), color, horizontal position (e.g., absolute and/or relative) and/or vertical position (e.g., absolute and/or relative) of the plurality of connected components.

The layout analyzer 100 can utilize the information stored in the connected component store 810 in order to perform layout analysis of connected component(s). The layout analyzer 100 is adapted to organize connected component(s) by color, vertical position and/or horizontal position. Thereafter, the layout analyzer 100 is adapted to join connected components based, at least in part, upon color, vertical position, horizontal position, join distance (e.g., distance between the connected components), height of the connected components and/or width of the connected components. The layout analyzer 100 can output layout information to be used, for example, by an encoder to enable data compression. The layout information can further enable reflow of connected component(s) on an output device (not shown) (e.g., computer display, PDA, text-enabled mobile telephone and/or text-enabled pager).

Figure 9:
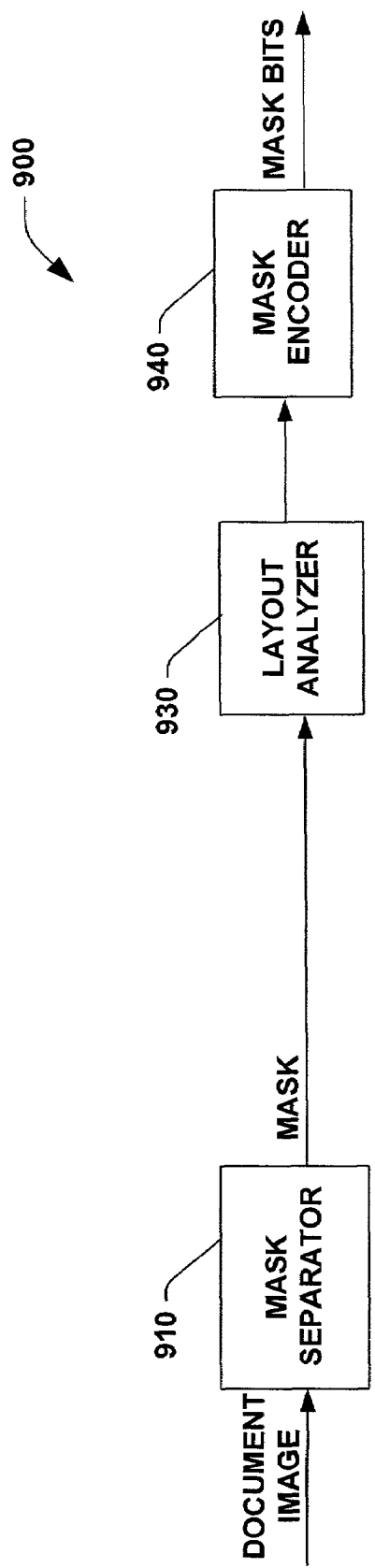
FIG. 9 is a block diagram of a segmented layered image system in accordance with an aspect of the present invention.

Referring next to FIG. 9, a segmented layered image system 900 in accordance with an aspect of the present invention is illustrated. The system 900 includes a mask separator 910, a layout analyzer 930 and a mask encoder 940. The system 900 receives a document image as an input and outputs mask bits.

The mask separator 910 receives a document image (e.g., based on a document to be archived and/or transmitted). For example, the segmented layered image system 900 can be part of a document compression system (not shown). The document image can be a binary, RGB and/or YUV representation of document(s). The mask separator component 910 processes the document image and outputs a mask (e.g., binary) indicating whether each pixel of the document image belongs in the foreground and/or background.

The layout analyzer 930 receives information regarding connected components and performs layout analysis of connected components. The layout analyzer 930 is adapted to organize connected component(s) by color, vertical position and/or horizontal position. Thereafter, the layout analyzer 930 is adapted to join connected components based, at least in part, upon color, vertical position, horizontal position, join distance (e.g., distance between the connected components), height of the connected components and/or width of the connected components. The layout analyzer 930 can output layout information to be used by the mask encoder 940.

For instance, the layout analyzer provide a logical ordering of the CC, and might greatly help in predicting the positions of each marks. Better position prediction yield better compression.

The mask encoder 940 encodes the mask and/or layout information into mask bits.

It is to be appreciated that the mask separator component 910, the layout analyzer 930 and/or the mask encoder 940 can be computer component(s) as that term is defined herein.

Figure 10:
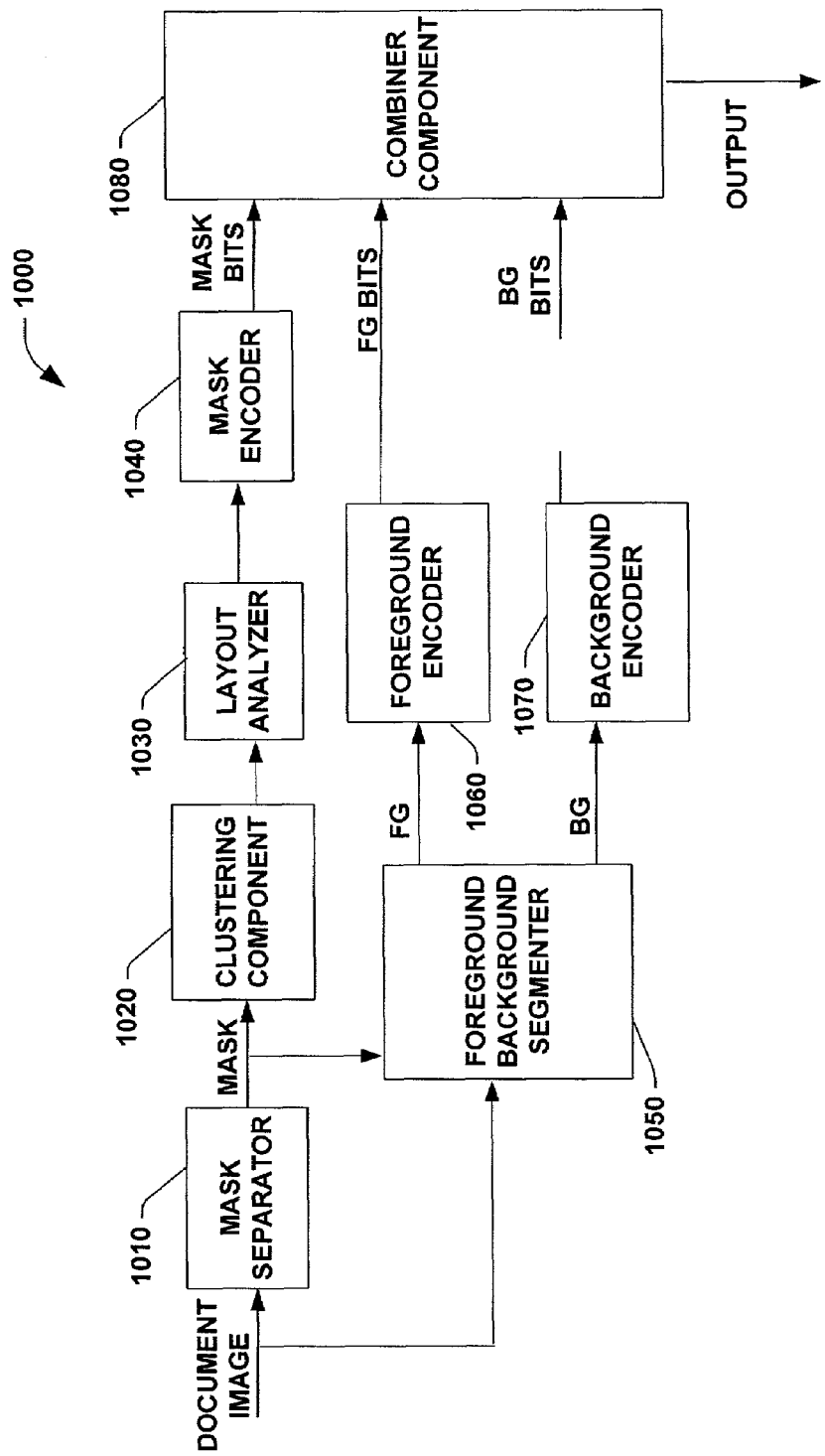
FIG. 10 is a block diagram of a segmented layered image system in accordance with an aspect of the present invention.

Turning next to FIG. 10, a segmented layered image system 1000 in accordance with an aspect of the present invention is illustrated. The system 1000 includes a mask separator 1010, a clustering component 1020, a layout analyzer 1030, a mask encoder 1040, a foreground/background segmenter 1050, a foreground encoder 1060, a background encoder 1070 and a combiner component 1080. It is to be appreciated that the foreground/background segmenter 1050, the foreground encoder 1060, the background encoder 1070 and/or the combiner component 1080 can be computer component(s) as that term is defined herein.

The foreground/background segmenter 1050 receives the mask from the mask separator 1010 and the document image. The foreground background segmenter 1050 uses the mask to generate a foreground image and a background image from the document image. For each pixel of the document image, a corresponding pixel of the mask is referenced. The pixel is allocated to the foreground image or the background image based on that corresponding pixel of the mask. For example, if the corresponding pixel of the mask is a "1", the pixel is assigned to the foreground image. Conversely, if the corresponding pixel of the mask is a "0", the pixel is assigned to the background image. It is appreciated that whether a "0" or "1" indicates the foreground or background can vary.

The foreground encoder 1060 receives the foreground image and encodes the foreground image to generate compressed bits or a compressed foreground stream of bits from the foreground image. Any suitable encoding technique can be used for the foreground encoder 1060. For example, progressive wavelength encoding or progressive transform encoding can be used to encode the foreground image.

The background encoder 1070 receives the background image and encodes the background image to generate compressed bits or a compressed background stream of bits from the background image. For example, progressive wavelength encoding or progressive transform encoding can be used to encode the foreground image.

The combiner component 1080 receives the compressed bits from the mask encoder 1040, the foreground encoder 1060 and/or the background encoder 1070 and combines the bits into an output stream or output file. The combiner component 1080 can include header information in the output file identifying or providing information such as encoding types, dictionaries and the like that can be used by a decoder to reconstruct the document image.

It is to be appreciated that the system and/or method of the present invention can be utilized in an overall segmented layered image system facilitating identification and/or compression of text, handwriting, drawings and the like. Further, those skilled in the art will recognize that the system and/or method of the present invention can be employed in a vast array of document image applications, including, but not limited to, photocopiers, document scanners, optical character recognition systems, PDAs, fax machines, digital cameras, tablet personal computers and/or digital video cameras.

Figure 11:
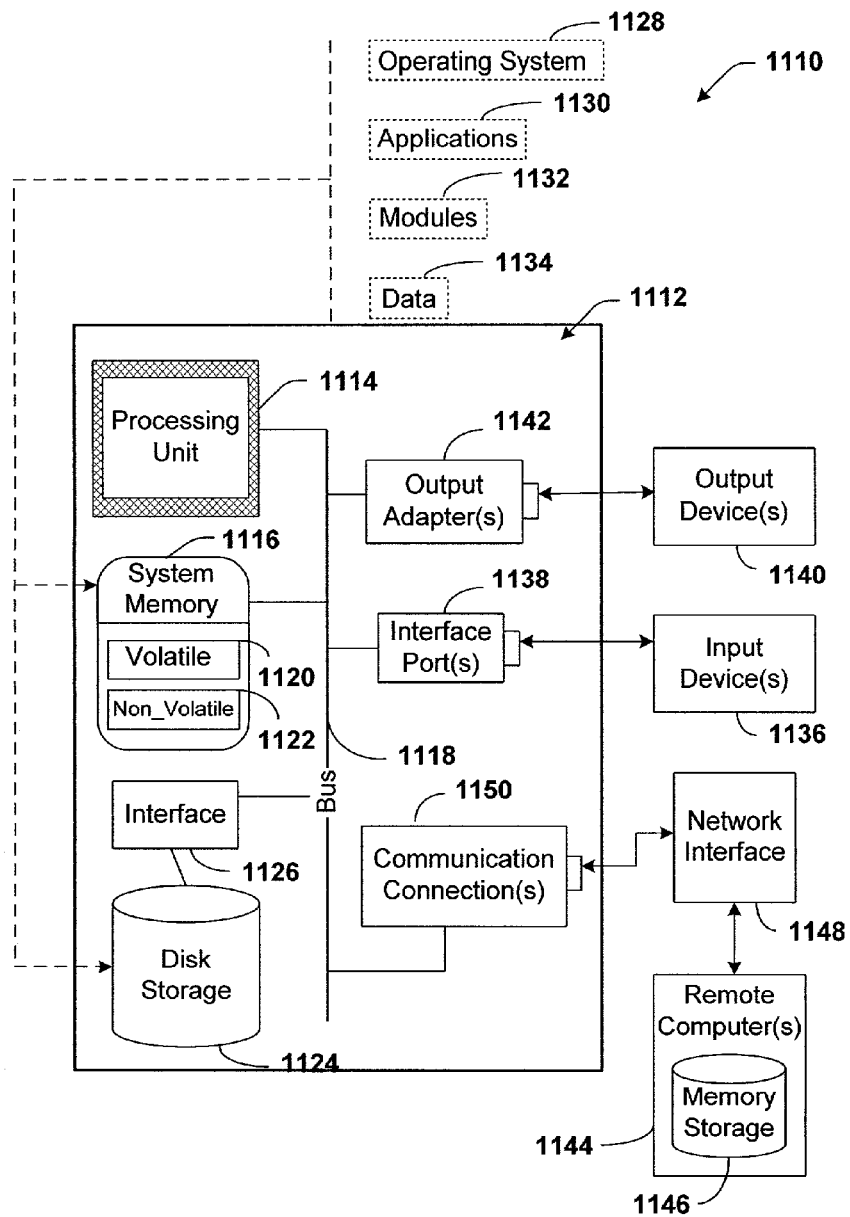
FIG. 11 illustrates an example operating environment in which the present invention may function.
Figure 12:
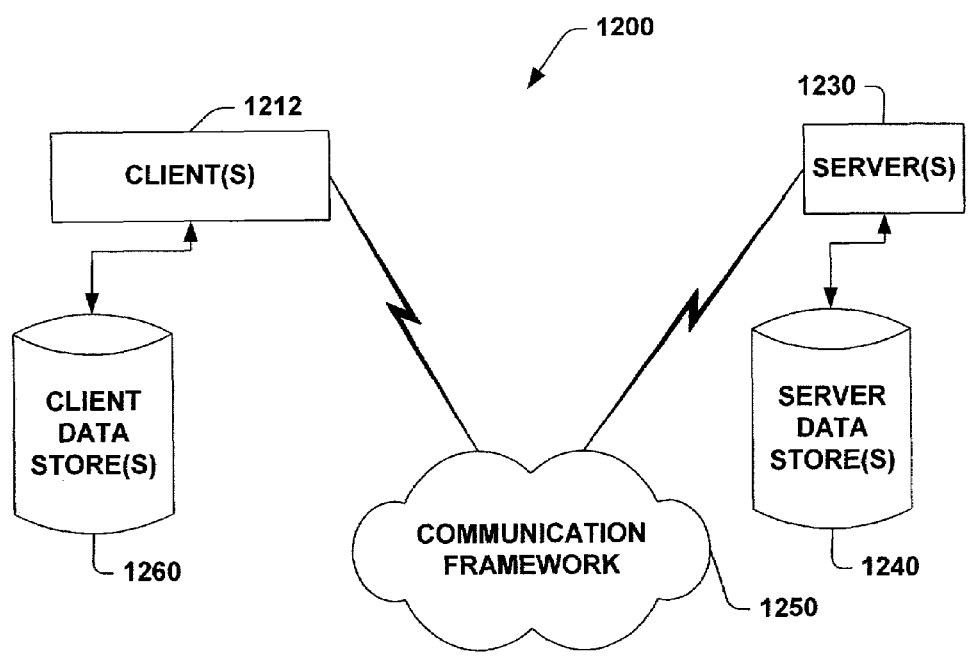
FIG. 12 is a schematic block diagram of an exemplary communication environment in accordance with the present invention.

In order to provide additional context for various aspects of the present invention, FIG. 11 and the following discussion are intended to provide a brief, general description of a suitable operating environment 1110 in which various aspects of the present invention may be implemented. FIG. 12 provides an additional and/or alternative operating environment in which the present invention can operate. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jazz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The server(s) 1230 can house threads to perform transformations by employing the present invention, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the server(s) 1230.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented layout analyzer that is recorded on computer storage media and capable of execution by a computer, comprising the following computer-executable components:
- a connected component organizer that organizes connected components by color, vertical position and horizontal position;
- a connected component joiner that joins connected components into words, based on statistics from groups comprising connected components and at least one of color, vertical position, horizontal position, height of connected components, or width of connected components;
- a word organizer that organizes words by at least one of color, vertical position, horizontal position, or length, or combinations thereof; and
- a word joiner that joins words into lines, based on statistics from groups comprising words and at least one of color, vertical position, horizontal position, height, width, angle, or length of words;
- wherein after each joining operation, the statistics from groups comprising the connected components and from groups comprising words are re-computed and output as revised statistics, each joining operation comprises joining components into words and joining words into lines and producing a respective list of potential connected components and words to be revisited for further joining by the component joiner and word joiner utilizing the revised statistics;
- wherein the word joiner provides the output to the connected component joiner to initiate further attempted joining of connected components based in part upon the list of potential connected components and upon the revised statistics from previously joined connected components and words;
- wherein the layout analyzer outputs layout information to be used by an encoder to enable data compression and to enable reflow of connected components on an output device; and
- wherein the output from the encoder is then stored for use by a user.

2. The layout analyzer of claim 1, the connected component joiner providing an output to the word joiner to initiate further attempted joining of words based, at least in part, upon revised statistics from groups comprising words.

3. The layout analyzer of claim 1, further comprising:
- a line organizer that organizes lines by at least one of color, vertical position, horizontal position, or length, or combinations thereof; and,
- a line joiner that joins lines into block, based at least in part upon at least one of color, vertical position, horizontal position, height, width, angle, or length of line;
- wherein the line joiner provides an output to at least one of the connected component joiner to initiate further attempted joining of connected components based, at least in part, upon revised statistics from groups comprising the connected components, and the word joiner to initiate further attempted joining of words based, at least in part, upon revised statistics from groups comprising words.

4. The layout analyzer of claim 3, the connected component joiner providing an output to the line joiner to initiate further attempted joining of lines.

5. The layout analyzer of claim 3, the connected component joiner further joins connected components if a height of a first connected component is within a first height range of the height of a second connected component and a width of the first connected component is within a width range of the second connected component.

6. The layout analyzer of claim 1, the connected component organizer receiving connected component information comprising at least one of color, horizontal size, vertical size, horizontal position and vertical position of the connected components.

7. The layout analyzer of claim 1, the connected component joiner joins connected components if the connected components are within a join distance of each other.

8. A photocopier employing the layout analyzer of claim 1.

9. A document scanner employing the layout analyzer of claim 1.

10. An optical character recognition system comprising a processor and employing the layout analyzer of claim 1.

11. A personal digital assistant employing the layout analyzer of claim 1.

12. A fax machine employing the layout analyzer of claim 1.

13. A digital camera employing the layout analyzer of claim 1.

14. A digital video camera employing the layout analyzer of claim 1.

15. A tablet personal computer employing the layout analyzer of claim 1.

16. A segmented layered image system comprsing a processor and employing the layout analyzer of claim 1.

17. A method for layout analysis that is recorded on a computer storage media and capable of execution by a computer, comprising the following computer-executed acts:
- organizing connected components by color, vertical position and horizontal position;
- joining connected components into at least one word based on at least one of color, vertical position and horizontal position, a distance between the connected components, height of the connected components or width of the connected components
- producing a list of potential connected components to be revisited for further joining into words;
- re-computing statistics after each joining operation;
- utilizing the statistics and the list of potential connected components to initiate further joining of the connected components;
- outputting layout information to be used by an encoder to enable data compression and to enable reflow of connected components on an output device; and
- storing the output information from the encoder for use by a user.

18. The method of claim 17, joining of connected components being based, at least in part, upon whether the connected components are within a join distance of each other and a height of a first connected component is within a first height range of the height of a second connected component and a width of the first connected component is within a width range of the second connected component.

19. A layout analysis system that is recorded on a computer storage media and capable of execution by a computer, comprising the following computer-executable components:
- a connected component store storing information associated with a plurality of connected components; and
- a layout analyzer comprising a connected component organizer adapted to organize connected components by at least one of color, vertical position or horizontal position, or combinations thereof, the layout analyzer further comprising a connected component joiner adapted to join connected components into words, based on statistics from groups comprising connected components and at least one of color, vertical position, horizontal position, height of connected components, or width of connected components the layout analyzer further comprising a word organizer adapted to organize words by at least one of color, vertical position, horizontal position, or length, or combinations thereof, the layout analyzer further comprising a word joiner adapted to join words into lines, based on statistics from groups comprising words and at least one of color, vertical position, horizontal position, height, width, angle, or length of words,
- wherein after each joining operation, the statistics are re-computed and output as revised statistics from groups comprising the connected components and from groups comprising words, each joining operation comprises joining components into words and joining words into lines and producing a respective list of potential connected components and words to be revisited for further joining by the component joiner and word joiner utilizing the revised statistics,
- wherein the word joiner provides the output to the connected component joiner to initiate further attempted joining of connected components based in part upon the list of potential connected components and upon the revised statistics from previously joined connected components and words,
- wherein the layout analyzer outputs layout information to be used by an encoder to enable data compression and to enable reflow of connected components on an output device, and
- wherein the output from the encoder is then stored for use by a user.

20. The layout analysis system of claim 19, the connected component store storing at least one of horizontal size, vertical size, horizontal position and vertical position associated with the plurality of connected components.

21. A method for layout analysis that is recorded on a computer storage media and capable of execution by a computer, comprising the following computer-executed acts:
- organizing connected component information;
- joining connected components into words;
- producing a list of potential connected components to be revisited for further joining into words;
- joining words into a line;
- producing a list of potential words to be revisited for further joining into lines;
- re-computing statistics after joining each word into a line;
- utilizing the statistics to attempt further joining of connected components into words based, at least in part, upon revised statistics generated by the joining of words into lines and upon the list of potential connected components;
- joining lines into a block;
- re-computing statistics after joining each line into a block;
- utilizing the statistics to attempt further joining of connected components into words based, at least in part, upon revised statistics generated by the joining of lines into the block and upon the list of potential connected components;
- re-computing statistics after joining each connected component into a word;
- utilizing the statistics to attempt further joining of words into lines based, at least in part, upon revised statistics generated by the joining of lines into the block and upon the list of potential words;
- outputting layout information to be used by an encoder to enable data compression and to enable reflow of connected components on an output device; and
- storing the output information from the encoder for use by a user.

22. A segmented layered image system that is recorded on a computer storage media and capable of execution by a computer, comprising the following computer-executable components:
- a mask separator adapted to assign pixels of a document image into at least one of a foreground and a background, the assignment information stored in a mask;
- a layout analyzer comprising a connected component organizer adapted to organize connected components by at least one of color, vertical position or horizontal position, or combinations thereof the layout analyzer further comprising a connected component joiner adapted to join connected components into words, based on statistics from groups comprising connected components and at least one of color, vertical position, horizontal position, height of connected components, or width of connected components, the layout analyzer further comprising a word organizer adapted to organize words by at least one of color, vertical position, horizontal position, or length, or combinations thereof, the layout analyzer further comprising a word joiner adapted to join words into lines, based on statistics from groups comprising words and at least one of color, vertical position, horizontal position, height, width, angle, or length of words,
- wherein after each joining operation, the statistics from groups comprising the connected components and from groups comprising words are re-computed and output as revised statistics, each joining operation comprises joining components into words and joining words into lines and producing a respective list of potential connected components and words to be revisited for further joining by the component joiner and word joiner utilizing the revised statistics,
- wherein the word joiner provides the output to the connected component joiner to initiate further attempted joining of connected components based in part upon the list of potential connected components and upon the revised statistics from previously joined connected components and words,
- wherein the layout analyzer outputs layout information to be used by an encoder to enable data compression and to enable reflow of connected components on an output device, and
- wherein the output from the encoder is then stored for use by a user; and
- a mask encoder operative to encode the mask into a mask bit stream.

23. A system for layout analysis that is recorded on a computer storage media and capable of execution by a computer, comprising:
- a data packet adapted to be transmitted between two or more computer components that facilitates layout analysis, the data packet comprising:

layout information comprising data identifying at least two connected components as joined to each other, joining being based, at least in part, upon at least one of color, vertical position, horizontal position, a distance between the connected components, height of the connected components or width of the connected components;

wherein after each joining operation, the layout information is re-computed and output as revised statistics from groups comprising the connected components and from groups comprising words, each joining operation comprises joining components into words and joining words into lines and producing a respective list of potential connected components and words to be revisited for further joining utilizing the revised statistics;

wherein providing the output to the connected component to initiate further attempted joining of connected components based in part upon the list of potential connected components and upon the revised statistics from previously joined connected components and words;

wherein the layout analyzer outputs layout information to be used by an encoder to enable data compression and to enable reflow of connected components on an output device; and wherein the output from the encoder is then stored for use by a user.

24. A computer storage media storing computer executable components of a system for layout analysis, comprising:

a connected component organizer that organizes connected components by at least one of color, vertical position or horizontal position, or combinations thereof;

a connected component joiner that joins connected components into words, based on statistics from groups comprising connected components and at least one of color, vertical position, horizontal position, height of connected components, or width of connected components;

a word organizer that organizes words by at least one of color, vertical position, horizontal position, or length, or combinations thereof; and a word joiner that joins words into lines, based on statistics from groups comprising words and at least one of color, vertical position, horizontal position, height, width, angle, or length of words;

wherein after each joining operation, the statistics from groups comprising the connected components and from groups comprising words are re-computed and output as revised statistics, each joining operation comprises joining components into words and joining words into lines and producing a respective list of potential connected components and words to be revisited for further joining by the component joiner and word joiner utilizing the revised statistics;

wherein the word joiner provides the output to the connected component joiner to initiate further attempted joining of connected components based in part upon the list of potential connected components and upon the revised statistics from previously joined connected components and words;

wherein the layout analyzer outputs layout information to be used by an encoder to enable data compression and to enable reflow of connected components on an output device; and wherein the output from the encoder is then stored for use by a user.

25. A method for layout analysis that is recorded on a computer storage media and capable of execution by a computer, comprising:

organizing connected component information;

joining connected components into words;

producing a list of potential connected components to be revisited for further joining into words;

joining words into a line;

producing a list of potential words to be revisited for further joining into lines;

re-computing statistics after joining each word into a line;

utilizing the statistics to attempt further joining of connected components into words based, at least in part, upon revised statistics generated by the joining of words into lines and upon the list of potential connected components;

joining lines into a block;

re-computing statistics after joining each line into a block;

utilizing the statistics to attempt further joining of connected components into words based, at least in part, upon revised statistics generated by the joining of lines into the block and upon the list of potential connected components;

re-computing statistics after joining each connected component into a word;

utilizing the statistics to attempt further joining of words into lines based, at least in part, upon revised statistics generated by the joining of lines into the block and upon the list of potential words;

outputting layout information to be used by an encoder to enable data compression and to enable reflow of connected components on an output device; and storing the output information from the encoder for use by a user.

26. A computer-implemented layout analyzer that is recorded on a computer storage media and capable of execution by a computer, comprising:

computer-implemented means for organizing connected components by at least one of color, vertical position or horizontal position, or combinations thereof;

computer-implemented means for joining connected components into words, based on statistics from groups comprising connected components and at least one of color, vertical position, horizontal position, height of connected components, or width of connected components;

computer-implemented means for organizing words by at least one of color, vertical position, horizontal position, or length, or combinations thereof;

computer-implemented means for joining words into lines, based on statistics from groups comprising words and at least one of color, vertical position, horizontal position, height, width, angle, or length of words;

wherein after each joining operation, the statistics from groups comprising the connected components and from groups comprising words change and are re-computed and output as revised statistics, each joining operation comprises joining components into words and joining words into lines and producing a respective list of potential connected components and words to be revisited for further joining by the component joiner and word joiner utilizing the revised statistics; and wherein the computer-implemented means for joining words provides the output to the computer-implemented means for joining connected components to initiate further attempted joining of connected components based in part upon the list of potential connected components and upon the revised statistics from previously joined connected components and words;

computer-implemented means for outputting layout information to be used by an encoder to enable data compression and to enable reflow of connected components on an output device; and computer-implemented means for storing the output information from the encoder for use by a user.

* * * * *